United States Patent
Boisgontier

(10) Patent No.: US 9,387,782 B2
(45) Date of Patent: Jul. 12, 2016

(54) HINGE MECHANISM AND VEHICLE SEAT COMPRISING SUCH A MECHANISM, AND METHOD FOR MAKING SUCH A MECHANISM

(71) Applicant: Faurecia Sieges d'Automobile, Nanterre (FR)

(72) Inventor: Joel Boisgontier, Lonlay L'Abbaye (FR)

(73) Assignee: Faurecia Sieges d'Automobile, Nanterre (FR)

( * ) Notice: Subject to any disclaimer, the term of this patent is extended or adjusted under 35 U.S.C. 154(b) by 0 days.

(21) Appl. No.: 14/887,637

(22) Filed: Oct. 20, 2015

(65) Prior Publication Data
US 2016/0039317 A1    Feb. 11, 2016

Related U.S. Application Data

(62) Division of application No. 13/869,722, filed on Apr. 24, 2013, now abandoned.

(30) Foreign Application Priority Data

Apr. 25, 2012    (FR) ...................... 12 53809

(51) Int. Cl.
| | |
|---|---|
| B21K 25/00 | (2006.01) |
| B21K 13/02 | (2006.01) |
| B23P 11/00 | (2006.01) |
| B60N 2/235 | (2006.01) |

(52) U.S. Cl.
CPC .............. *B60N 2/2356* (2013.01); *B21K 25/00* (2013.01); *B23P 11/00* (2013.01); *B60N 2/235* (2013.01); *Y10T 29/24* (2015.01)

(58) Field of Classification Search
CPC ...... B60N 2/2356; B60N 2/235; B21D 53/00; B21D 39/03; B21D 39/031; Y10T 29/24; B21K 25/00; B23P 11/00
USPC ........................... 29/11, 505; 297/463.2, 362
See application file for complete search history.

(56) References Cited

U.S. PATENT DOCUMENTS

| | | | |
|---|---|---|---|
| 5,611,599 A | 3/1997 | Baloche et al. | |
| 8,201,887 B2 * | 6/2012 | Zellmann | B60N 2/682 297/362 |
| 8,807,655 B2 * | 8/2014 | Fassbender | B60N 2/2356 29/428 |
| 2002/0050732 A1 | 5/2002 | Koga et al. | |

FOREIGN PATENT DOCUMENTS

| | | |
|---|---|---|
| CN | 1496891 A | 5/2004 |
| CN | 102001296 A | 4/2011 |
| DE | 10 2005 046 807 B3 | 11/2006 |

(Continued)

OTHER PUBLICATIONS

Search Report for related French Application No. 12 53809; report dated Jan. 31, 2013.

*Primary Examiner* — Milton Nelson, Jr.
(74) *Attorney, Agent, or Firm* — Miller, Matthias & Hull LLP

(57) ABSTRACT

Hinge mechanism for a vehicle seat, comprising: first and second frames mounted so that they can rotate relative to one another; and an annular ring comprising a cylindrical base which covers the peripheral edges of the frames, and first and second side flaps. The ring does not comprise a portion that is in contact with one of the inner faces of the frames.

12 Claims, 4 Drawing Sheets

(56) References Cited

FOREIGN PATENT DOCUMENTS

| DE | 102009052579 A1 | 5/2011 | |
| FR | 2900605 A1 * | 11/2007 | ........... B60N 2/2356 |
| FR | 2 915 436 A1 | 10/2008 | |
| JP | 2008 018108 A | 1/2008 | |

* cited by examiner

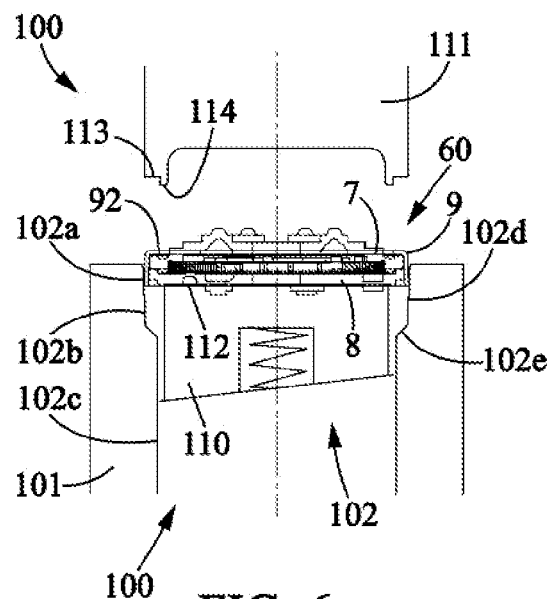
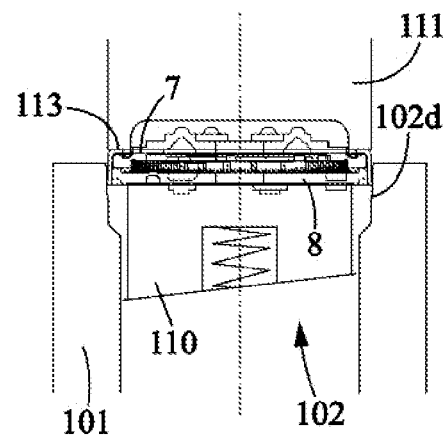
FIG. 6a
FIG. 6b
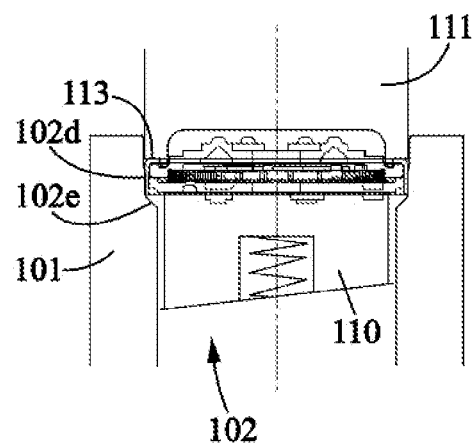
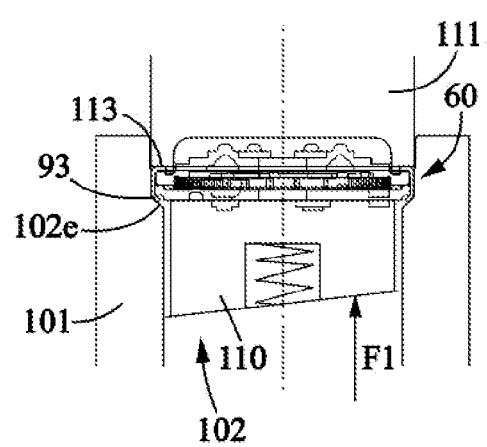
FIG. 6c
FIG. 6d

HINGE MECHANISM AND VEHICLE SEAT COMPRISING SUCH A MECHANISM, AND METHOD FOR MAKING SUCH A MECHANISM

CROSS-REFERENCE TO RELATED APPLICATIONS

This is a divisional application under 35 U.S.C. §121 of U.S. patent application Ser. No. 13/869,722 filed on Apr. 24, 2013, which in turn claims priority under the Paris Convention and 35 U.S.C. §119 to French Patent Application No. 12 53809, filed on Apr. 25, 2012.

FIELD OF THE INVENTION

The invention relates to hinge mechanisms, vehicle seats comprising such mechanisms, as well as a method for making such mechanisms.

BACKGROUND OF THE INVENTION

More specifically, the invention relates to a hinge mechanism for a vehicle seat, comprising:
- first and second frames mounted so that they can rotate relative to one another about an axis, said frames comprising inner faces oriented inward and facing one another, outer faces oriented outward and away from each other, and circular peripheral edges distanced from the axis, and
- an annular ring comprising a base which covers the peripheral edges of the frames, and first and second side flaps which cover at least a portion of each of the outer faces.

Document FR-A-2 915 436 describes an example of a hinge mechanism of this type, which has been satisfactory and in which the ring additionally comprises a shoulder pressing on the inner face of the second frame. This allows shaping the second flap by crimping it between the inner face and the outer face of the second frame. Due to this shoulder of the ring and this crimping process, the first frame is not held by the crimping of the first flap of the ring, which would prevent the first frame from rotating relative to the second frame. Operating clearances are maintained between the first frame and the ring, then between the second frame and the first frame, which allows the rotation to occur.

The goal of the invention is to propose an alternative assembly of the first and second frames which must be rotatable relative to each other.

SUMMARY OF THE INVENTION

For this purpose, the hinge mechanism of the above type is characterized by the base having a cylindrical shape which extends in the direction of the axis directly between the first side flap and the second side flap, and by the ring not comprising a portion in contact with one of the inner faces of the frames.

Because of these arrangements, the ring is simpler in form while preserving the rotatability of the first and second frames relative to one another. The second frame does not have a radial extension against which a shoulder of the ring presses. The second frame has an outside diameter that is less than that of the prior art, and the hinge mechanism of the invention is therefore less bulky.

Also, the second frame requires less material. It is therefore less costly.

In various embodiments of the hinge mechanism according to the invention, one or more of the following arrangements may be applied.

In one aspect of the invention, axial play along the direction of the axis is preserved between the first side flap and the first frame during the formation of the second side flap against the second frame.

In one aspect of the invention, the second frame has a diameter greater than a diameter of the first frame, and the difference between said diameters is less than 1 mm.

In one aspect of the invention, the second frame has a diameter equal to a diameter of the first frame.

In one aspect of the invention, the peripheral edge of the second frame is in close contact with an inner face of the base in order to attach the ring solidly to the second frame.

In one aspect of the invention, the peripheral edge of the second frame comprises teeth which engage with the inner face of the base in order to attach the ring solidly to the second frame.

In one aspect of the invention, the first side flap comprises indentations extending from said first side flap in the direction of the outer face of the first frame, said indentations being greater than or equal to three in number.

In one aspect of the invention, the base of the ring comprises a conical inner face in order to grip the peripheral edge of the second frame radially and leave the peripheral edge of the first frame free to rotate.

The invention also relates to a seat of a vehicle, comprising first and second parts connected to each other by a hinge mechanism as defined above, the first frame being attached to the first part and the second frame being attached to the second part.

In one possible arrangement, the first part is a frame of a seat back and the second part is a frame of a seat bottom.

The invention also relates to a method for making a hinge mechanism for a vehicle seat, comprising the following steps:
a) an assembly is provided which comprises:
- first and second frames able to be mounted so that they can rotate relative to one another about an axis, said frames comprising inner faces oriented inward and towards one another, outer faces oriented outward and away from each other, and circular peripheral edges distanced from the axis, and
- an annular ring comprising a cylindrical base which covers the peripheral edges of the frames, and a first side flap which covers at least a portion of the outer face of the first frame, b) a second side flap is formed by folding a portion of the ring towards the outer face of the second frame and by pressing against the outer face of the first frame.

By these arrangements, the ring is crimped onto the outer face of the second frame, forming a second flap. Simultaneously, an operating clearance is preserved between the first side flap and the first frame. The hinge mechanism made in this manner preserves a second frame that can rotate relative to the first frame.

The ring is simpler in shape than the known rings which have a shoulder pressing on an inner face of the second frame.

In some embodiments of the method for making a hinge mechanism according to the invention, one or more of the following arrangements may be used.

In one aspect of the invention, the following step is carried out between steps a) and b):
- the ring is positioned relative to the first frame with a predetermined clearance with a first tool comprising first and second surfaces, the first surface being adapted to press against the first side flap, the second surface being adapted to press against the first outer surface, and said surfaces being offset in the direction of the axis to ensure said predetermined clearance between an inner surface of the first side flap and the first outer surface of the first frame, the ring being pushed towards said first tool and said first tool being pushed towards said first frame so that said surfaces are pressing against one another.

In one aspect of the invention, the ring is squeezed radially inward onto the peripheral edge of the second frame.

In one aspect of the invention, step b) is carried out in at least the two following sub-steps:

b1) the portion of the ring is folded to a first angle to form a flange sloping at said first angle, and b2) said flange is folded to a second angle, substantially 90°, to form the second side flap facing the outer face of the second frame, the assembly being pushed towards a die by a first tool pressing against the outer face of the first frame.

In one aspect of the invention, the first angle is between 30° and 60°, and preferably substantially equal to 45°.

BRIEF DESCRIPTION OF THE DRAWINGS

Other features and advantages of the invention will be apparent from reading the following description of one of its embodiments provided as a non-limiting example, with reference to the attached drawings.

In the drawings:

FIGS. 6a to 6h are views showing successive steps of an embodiment of a method for making the hinge mechanism according to the invention of FIG. 3.

The same references are used to denote identical or similar elements in the various figures.

DETAILED DESCRIPTION OF THE DRAWINGS

Figure 1:
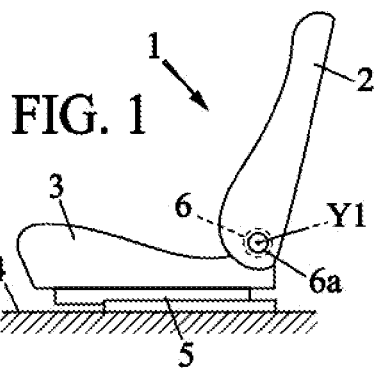
FIG. 1 is a schematic view of a vehicle seat equipped with a hinge mechanism according to an embodiment of the invention.

FIG. 1 represents a front seat 1 of an automotive vehicle, which comprises a seat back 2 assembled to pivot about an axis Y1 on a seat bottom 3, said seat bottom being mounted onto a floor 4 of the vehicle, for example by means of slide rails 5.

The tilt of the seat back 2 is thus adjustable by means of a control level 6a or similar device which drives a geared hinge mechanism 6 (a mechanism which allows adjusting the tilt of the seat back 2).

This hinge mechanism 6 comprises (see FIG. 2 of the prior art and FIG. 3 of the invention):

a first frame 7 formed by a first metal plate extending within a plane perpendicular to the axis Y1 and which, in the example represented, is solidly attached to the frame of the seat back 2, a second frame 8 formed by a second metal plate extending parallel to the first frame 7, said second frame 8 being solidly attached to the frame of the seat bottom 3, the first frame 7 being mounted so that it can rotate relative to the second frame, and engaging elements which connect the first frame 7 to the second frame 8, for adjusting the angular position between said frames (the tilt of the seat back 2), and at least one input device, such as the control handle 6a, for controlling the setting of said angular position.

The first and second frames 7, 8 are held together at the outer edge of the hinge mechanism, by a ring 9.

The first and second frames 7, 8 and the ring 9 form a closed casing which delimits an inside and an outside. The engaging elements are on the inside. The seat back 2 and the seat bottom 3 are on the outside. The elements of the hinge mechanism 6 will be advantageously defined with these standard concepts of inside and outside relative to this closed hinge mechanism 6 assembly.

The first and second frames 7, 8 respectively comprise:

inner faces 71, 81 oriented towards the inside of the hinge mechanism, meaning facing one another and close enough to come into contact with each other on at least a peripheral portion of the mechanism, outer faces 72, 82 oriented towards the outside of the hinge mechanism, meaning facing away from each other, and circular peripheral edges 73, 83 located at the radial extremity of the frames, distanced from the axis Y1.

The ring 9 is annular, of a general U shape with its opening facing inwards (towards the axis Y1).

Figure 2:
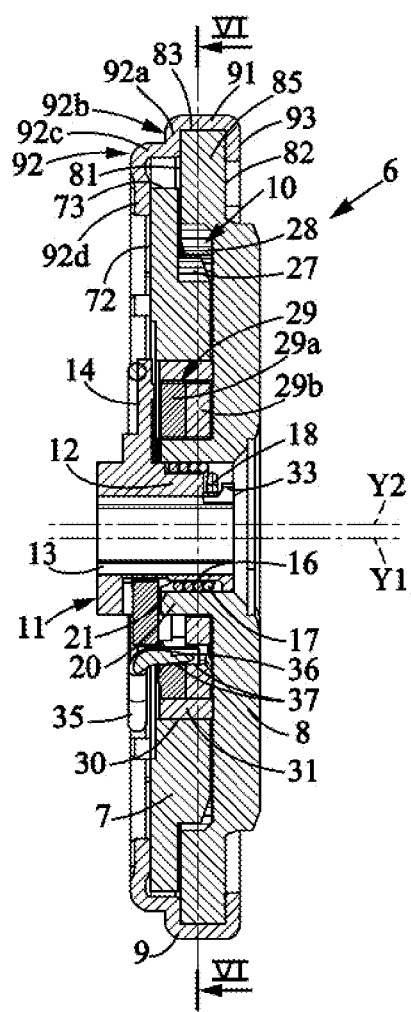
FIG. 2 is an axial cross-sectional view of a hinge mechanism according to the prior art.

In the embodiment known from the prior art, represented in FIG. 2 and summarized in said document FR-A-2 915 436, the peripheral edge 83 of the second frame 8 has a diameter greater than the diameter of the peripheral edge 73 of the first frame. The second frame 8 thus comprises an extension 85 in a radial direction perpendicular to the axis Y1, which forms a portion where the ring 9 is crimped onto each of its faces: the outer face 82 and the inner face 81.

The ring 9 thus comprises:

a cylindrical base 91 which covers or crowns the peripheral edge 83 of the second frame 8, a first side flap 92 which at least partially covers a peripheral portion of the inner face 81 of the second frame 8 and a peripheral portion of the outer face 72 of the first frame 7, and a second side flap 93 which covers a portion of the outer face 82 of the second frame 8.

The first side flap 92 has a general S shape forming a shoulder pressing against the inner face 81 of the second frame 8.

This first side flap 92 comprises, from the base 91, firstly a first portion 92a which covers a portion of the inner face 81 of the second frame 8, an elbow 92b, a second portion 92c which extends substantially in parallel to the axis Y1 while moving away from the inner face 81, and a third portion 92d which extends transversely towards the axis Y1 from an end of the second portion, until it laterally reaches the outer face 72 of the first frame 7.

Because of this form, the first side flap 92 and the second side flap 93 crimp the ring 9 onto the extension 85 of the second frame 8. The ring 9 is solidly attached to this second frame 8, and the second and third portions 92c, 92d of the first side flap are shaped to maintain at least some clearance in the direction of the axis Y1 so that the first frame 7 can rotate relative to the second frame 8.

Figure 3:
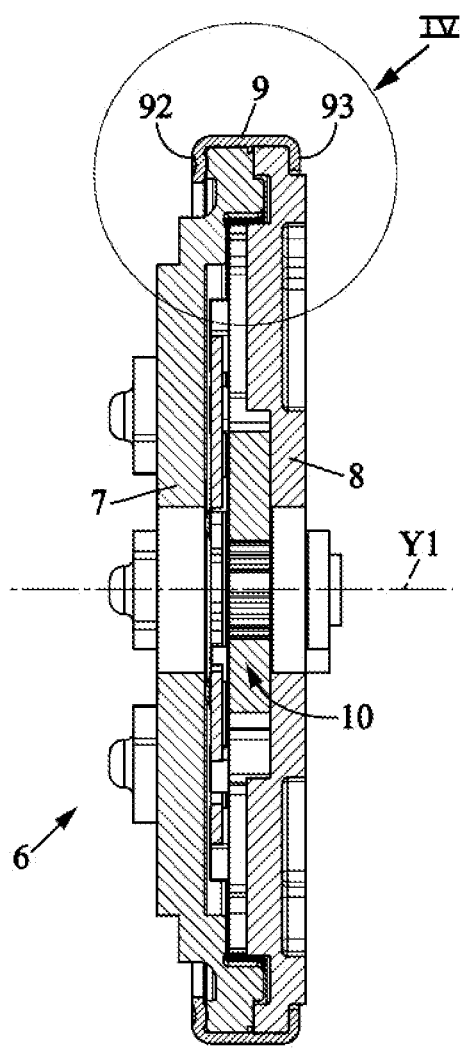
FIG. 3 is an axial cross-sectional view of a hinge mechanism according to the invention.
Figure 4:
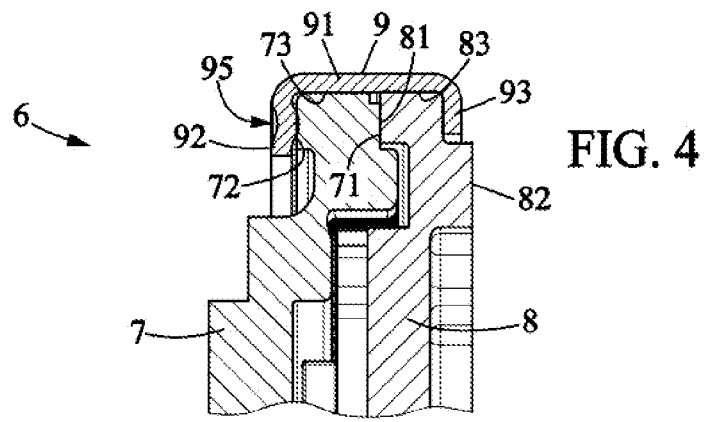
FIG. 4 is an axial cross-sectional view of an enlarged portion of FIG. 3.
Figure 5:
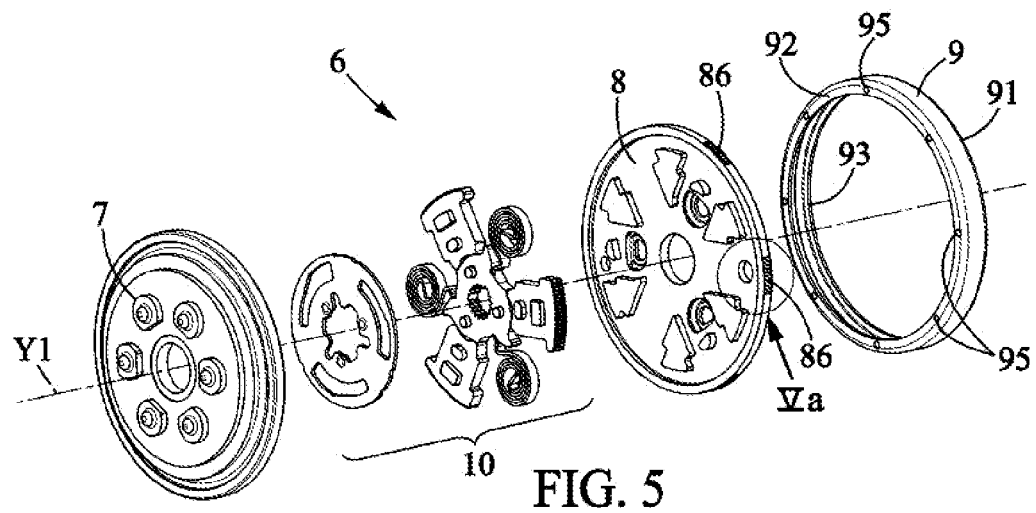
FIG. 5 is an exploded perspective view of the hinge mechanism of FIG. 3.

In one embodiment of the invention, presented in FIGS. 3 to 5, the ring 9 comprises:

a cylindrical base 91 which covers or crowns the two peripheral edges 73, 83, a first side flap 92 which at least partially covers a peripheral portion of the outer face 72 of the first frame 7, without covering any portion of the inner face 81 of the second frame 8, said inner face 81 solely facing the inner face 71 of the first frame 7, and a second side flap 93 which covers a portion of the outer face 82 of the second frame 8.

The base 91 extends substantially in the direction of the axis Y1 directly between the first side flap 92 and the second side flap 93. This ring 9 therefore encloses the first and second frames 7, 8 of the hinge mechanism.

The ring 9 of the invention therefore differs from the ring of the prior art by its first side flap 92 which does not include any contact with one of the inner faces of the frames. In particular, the ring 9 has no contact with the inner face 81 of the second frame 8. In other words, the ring 9 does not press on one of the inner faces 71, 81. For example, it does not press on a portion of the inner face 81 of the second frame 8.

The ring 9 is therefore an annular piece having an axis Y1 and having a C-shaped cross-section with its opening facing the axis. The base 91 which extends along the direction of the axis Y1 corresponds to the vertical portion of the C shape. The first and second side flaps 92, 93 correspond to the horizontal arms of the C shape.

The first and second flaps 92, 93 are formed by folding or bending a ring preform, towards the first and second frames 7, 8. A first folding or bending reshapes the preform to shape the first flap 92 towards the first frame 7. A second folding or bending reshapes the resulting preform to shape the second flap 93 towards the second frame 8, this second folding being performed without crimping the frames to each other and therefore without attaching them to one another.

Axial play in the direction of the axis Y1 is preserved so that the first frame 7 can rotate relative to the second frame 8, specifically due to the method for creating said ring 9 which will be explained below in the description.

Because of this axial play, the ring 9 encloses the frames 7, 8 without crimping them together. The frames remain able to rotate relative to one another about the axis Y1.

The ring 9 is, for example, in contact with a peripheral edge 83 of the second frame. Advantageously, it is forcibly pressed onto said peripheral edge 83. Thus the ring 9 is solidly attached to the second frame 8.

The ring 9 comprises a slightly conical inner face at the base 91 which grips the peripheral edge 83 of the second frame 8 and leaves the peripheral edge 73 of the first frame 7 free. Specifically, the inner face of the ring narrows towards the axis Y1, from the first frame 7 to the second frame 8. The ring 9 is thus solidly attached to the second frame 8 while having radial play with the first frame 7 so that the first frame 7 can rotate.

Said inner face of the base 91, which is conical in shape, forms for example an angle of less than 5° with the direction of the axis Y1, and preferably less than 1°.

Figure 5A:
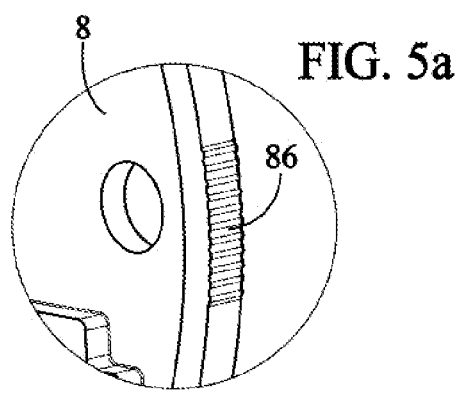
FIG. 5a is an enlarged view of a portion of the outer edge of the second frame shown in the exploded view of FIG. 5.

The peripheral edge 83 of the second frame may possibly comprise teeth 86 that project beyond the diameter of said peripheral edge 83. These teeth are, for example, low in height, for example less than 0.5 mm and preferably less than 0.2 mm. These teeth 86 may be distributed along the entire circumference or in angular sections about the axis Y1, as represented in FIG. 5a. These teeth 86 can have various shapes, including teeth of triangular or trapezoid cross-section, and sine waves, or waves formed of circle sections. These teeth 86 engage with the ring 9 when the ring 9 is assembled onto the frame 8. The ring 9 is thus even more solidly attached to the second frame 8.

The second frame 8 advantageously has a diameter greater than or equal to the diameter of the first frame 7. The first frame then has radial play with the inner face of the base 91 of the ring 9, and the first frame 7 can rotate relative to the ring 9 and to the second frame 8.

The difference between the diameter of the second frame and the diameter of the first frame is, for example, less than 1 mm. The extension 85 found in the prior art therefore does not exist. Its radial volume is eliminated. The total outer diameter of the hinge mechanism 6 is less than that of the prior art.

The second frame 8 advantageously has a diameter equal to the diameter of the first frame 7. The extension 85 found in the prior art therefore does not exist. The total outside diameter of the hinge mechanism 6 is even lower. The radial volume is thus reduced even further.

Lastly, the first side flap 92 comprises indentations 95 formed by a local deformation in the direction of the axis Y1. Local deformation is understood to mean a cavity, for example a semi-spherical cavity. The axial operational clearance in the direction of the axis Y1, necessary for the rotation of the first frame 7 relative to the second frame 8, can thus be reduced. The indentations 95 are greater than or equal to three in number, and are advantageously distributed regularly along the circumference of the first side flap.

The hinge mechanism 6 is made according to the method defined below, and as represented in FIGS. 6a to 6h.

In a first step, an assembly 60 is provided which comprises:
first and second frames 7, 8 suitable for being mounting so that they can rotate relative to one another about an axis, said frames comprising, in the direction of the axis, inner faces 71, 81 oriented inward and towards one another, and outer faces 72, 82 oriented outward and away from each other, and comprising, in a direction perpendicular to the axis, circular peripheral edges 73, 83 distanced from the axis Y1, and an annular ring 9 comprising a cylindrical base 91 which covers the peripheral edges of the frames, and a first side flap 92 substantially perpendicular to the base and which covers at least a portion of the outer face 72 of the first frame 7.

Note for this assembly 60 that the second side flap 93 of the ring 9 is still not shaped. It comprises, in the axial extension of the base 91 and opposite the first side flap 92, material for forming said second flap 93 by stamping or crimping around the axis.

All known means and all known methods are usable for making the first and second frames 7, 8 and the preformed ring 9. These parts may in particular be formed by stamping sheet metal.

In a second step illustrated in FIG. 6a, the assembly 60 is mounted in a press 100, which comprises:
a press die 101 comprising a first bore hole 102,
a first lower tool 110 (counter-punch) and a first upper tool 111 (punch) which are able to move towards each other within the first bore hole 102.

The assembly 60 is set down or placed on the first lower tool 110, for example by simply stacking from bottom to top: the second frame 8, the first frame 7, and the ring 9 with its first side flap 92 extending above the first frame 7.

The first bore hole 102 comprises, for example, three cylindrical portions that are coaxial around the axis Y1. A first portion 102a opening onto the upper surface of the die 101 has a first diameter that is slightly greater than the outside diameter of the ring 9 stacked onto the assembly 60. A second intermediate portion 102b has a second diameter slightly less than said outside diameter of the ring 9. This second portion 102b is positioned as the extension of the first portion and lies beneath it, such that a first narrowing 102d of the bore hole 102 between said first and second portions reduces the diameter of the bore hole 102 from the first diameter to the second diameter. For the first and second diameters, the term "slightly" is understood to mean having a difference in diameter of less than 1 mm compared to the diameter of the ring 9, and preferably less than 0.2 mm. A third portion 102c has a third diameter which is less than the second diameter. It is located towards the bottom, as the extension of the second portion 102b and beneath it, such that a second narrowing 102e further reduces the diameter of the bore hole 102, causing it to change from the second diameter to the third diameter. The third diameter corresponds, for example, substantially to an inside diameter of the first and/or second side flaps 92, 93 of the ring 9 once it is completely shaped. The first and second narrowing sections 102d, 102e are conical in shape for example, progressively reducing the diameter of the bore hole 102.

The first lower tool 110 is substantially cylindrical in shape, with its axis of revolution coaxial to the axis Y1. Its diameter is less than the third diameter of the bore hole 102, to enable it to move within all portions of the bore hole. It comprises an upper face 112 onto which the outer face 82 of the second frame 8 is placed, this outer face then being oriented downwards.

The first upper tool 111 is substantially cylindrical in shape, with its axis of revolution coaxial to the axis Y1. It comprises an annular protuberance along its edge, projecting downwards towards the assembly 60 placed on the first lower tool 110. This protuberance forms a shoulder which delimits a first outer annular surface 113 perpendicular to the axis and a second inner annular surface 114 perpendicular to the axis, said two surfaces 113, 114 being offset relative to each other by a first distance in the direction of the axis Y1.

In a third step illustrated in FIG. 6b, the first upper tool 111 has been lowered towards the assembly 60. The first surface 113 faces the first side flap 92 of the ring 9, and the second surface 114 comes into contact with the first frame 7 and presses downwards onto said first frame 7. The first and second frames 7, 8 are thus maintained in contact with each other, their inner faces 71, 81 mutually touching, between the first upper tool 111 and the first lower tool 110.

The first distance between the surfaces 113, 114 is slightly greater than the thickness of the sheet of the first flap 92. This first distance is equal to the thickness of the first flap 92 plus an operating clearance. The ring 9 can then be moved upward by the upward force exerted on said ring 9 until the first flap 92 comes into contact with the first surface 113. An operating clearance is thus formed under the first flap 92, between it and the outer face 72 of the first frame 7.

In a fourth step illustrated in FIG. 6c, the first lower tool 110 and the first upper tool 111 are moved together in a downward direction to bring the axial extension of the base 91 into contact with the second narrowing 102d of the first bore hole 102. The ring 9 thus partially enters the first narrowing 102d, and for example a portion of it facing the peripheral edge 83 of the second frame 8. This first narrowing 102d locally reduces the diameter of the ring 9 and radially squeezes or crimps it onto the peripheral edge 83 of the second frame 8, attaching them solidly together. In this step, the die 101 exerts an upward force on the ring 9, due to friction. The ring 9 thus maintains the position described above during this step, meaning a position in which the first side flap 92 is in contact with the first surface 113 of the first upper tool 111, which guarantees that the operating clearance between the first side flap 92 and the first frame 7 is maintained.

This fourth step allows solidly attaching the ring 9 to the second frame 8 by radially crimping it on, with the ring in the correct position for maintaining an axial operating clearance that allows the rotation of the first frame 7 relative to the second frame 8.

This fourth step can be carried out in various manners, possibly combined. In fact, the second frame 8 may comprise the teeth 86, or the ring 9 may have a substantially conical base 91, or the outside diameter of the peripheral edge of the second frame 8 may be greater than the inside diameter of the base 91.

In a fifth step illustrated in FIG. 6d, the first lower tool 110 and the first upper tool 111 are again moved downward, such that the axial extension of the base 91 is forced into the second narrowing 102e. The second narrowing has a conical shape which clasps or bends the axial extension of the base 91 in order to begin shaping the second side flap 93. This second narrowing 102e forms a first angle with the axis Y1, for example between 30° and 60°. It is preferably substantially equal to 45°, or one or two degrees more or less. The partially formed second flap 93 then is temporarily at an angle corresponding to said first angle. In this step, the die continues to exert upward force on the ring 9, which guarantees the predetermined position. In addition, this predetermined position cannot vary due to the radial crimping in the fourth step. The bend is therefore shaped on the ring 9, said ring being in said predetermined position in the direction of the axis Y1. The operating clearance in the axial direction is thus guaranteed, and the axial extension of the ring 9 assumes the form that is angled at the first angle for said predetermined position of the ring 9.

The hinge mechanism 6 assembly 60 is then extracted from the press 100 by moving the first upper tool 111 and the first lower tool 110 upward, in particular by exerting a first upward force F1 on the first lower tool 110.

This fifth step allows partially bending the second side flap 93 in order to shape it. It is possible for the method of the invention to do without this intermediate step, and directly perform the complete or total bending described in the following steps.

Figure 6E:
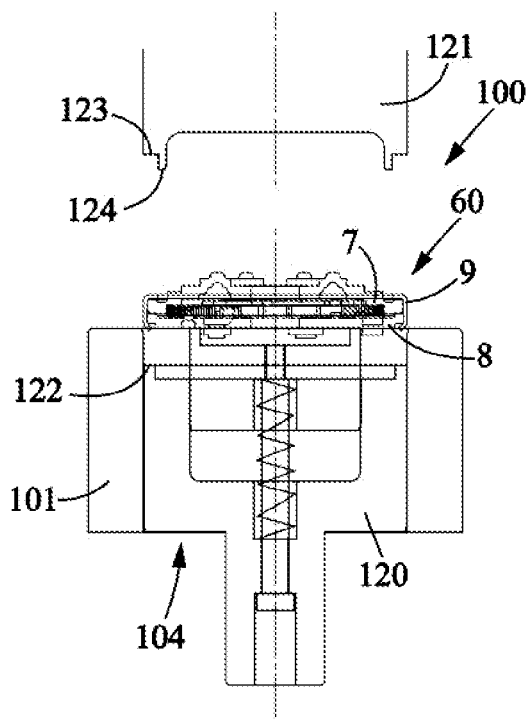

In a sixth step illustrated in FIG. 6e, the hinge mechanism 6 assembly 60 is positioned at another location in the press 100. At this location, the press die 101 comprises a second bore hole 104 that is different from the first bore hole 102, and the press 100 comprises a second lower tool 120 and a second upper tool 121 that are able to be moved towards each other within the second bore hole 104.

The second bore hole 104 is a simple bore hole that is cylindrical in shape, having a single inside diameter that is slightly greater than the outside diameter of the ring 9. The ring 9 and the assembly 60 can thus slide within this second bore hole 104. The assembly 60 is installed in this second bore hole 104 on the second lower tool 120; the second side flap 93, partially formed and angled at the first angle, is then placed against an annular surface 122 of the second lower tool 120. This annular surface 122 is substantially perpendicular to the axis.

The second upper tool 121 has a shape similar to the first upper tool 111. It comprises an annular protuberance extending in the direction of the axis Y1. This forms a shoulder delimiting a first outer annular surface 123 perpendicular to the axis and a second inner annular surface 124 perpendicular to the axis. However, these two surfaces 123, 124 are offset in the direction of the axis Y1 by a second distance which is greater than the first distance of the first upper tool 111. The first surface 123 can no longer come into contact with the first flap 92. Only the second surface 124 is able to come into contact with the outer face 72 of the first frame 7, in order to push the first frame 7 against the second frame 8.

Figure 6F:
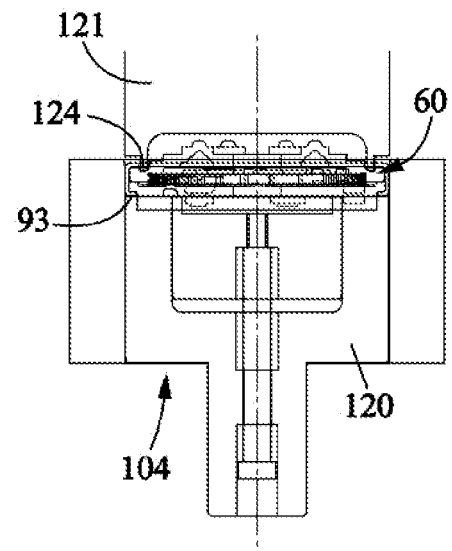

In a seventh step illustrated in FIG. 6f, the hinge mechanism 6 assembly 60 is positioned on the second lower tool 120. Then, the second upper tool 121 is brought down against the outer face 72 of the first frame 7, and exerts a downward force on the first frame 7 which pushes the assembly 60 towards and against the second lower tool 120.

The annular surface 122 of the second lower tool 120 then reshapes the second flap 93 bent at the first angle, until it assumes the shape of the annular surface 122, meaning until the second flap 93 is substantially perpendicular to the axis Y1, and until it is in contact with the outer face 82 of the second frame 8.

Because the second upper tool 121 is pressing against the outer face 72 of the first frame 7, and not against the first flap 92 of the ring 9, the operating clearance in the axial direction between the first flap 92 and the first frame 7 is maintained during this step of folding the second side flap 93 to 90°.

The assembly 60 is thus transformed into a hinge mechanism 6 with a ring 9 that is simple in shape, meaning without a radial extension to support the usual crimping of the ring 9 in the prior art. In addition, the axial operating clearance is maintained so that the first frame 7 can move rotationally relative to the first frame 8.

This seventh step allows completing the bending of the second side flap 93.

The two steps, the fifth step of partial bending and seventh step of completed bending, allow progressively folding this second side flap 93, with precise positioning in the direction of the axis which guarantees the axial operating clearance for the rotation of the frames relative to each other.

Figure 6G:
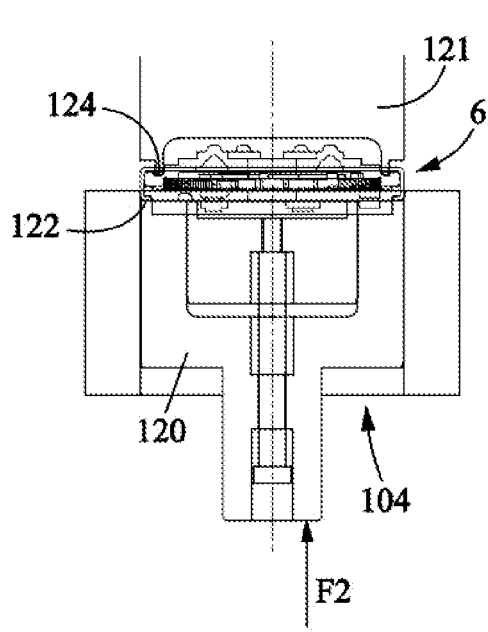
Figure 6H:
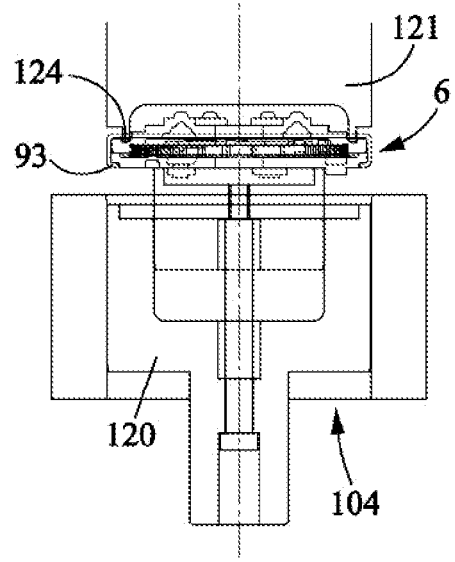

In an eighth step illustrated in FIG. 6g, the hinge mechanism 6 is finally removed from the press 100 by moving the second upper tool 121 and the second lower tool 120 upwards, in particular by exerting a second upward force F2 on the second lower tool 120. FIG. 6h shows the hinge mechanism 6 completely removed from the second bore hole 104 of the press 100.

The indentations 95 in the first side flap 92 can then be made before or after the formation of the second side flap 93, described in the steps presented above.

Said steps are only one embodiment of the invention; variations are possible. The method of the invention allows shaping a more simple ring 9 due to the step or steps of the method which allow forming the second side flap 93 by pressing against the outer face 72 of the first frame 7. The first distance of the first upper tool allows ensuring that an axial operating clearance is maintained between the frames 7, 8 and the side flaps 92, 93 of the ring 9.

With this method, the ring 9 does not have any portion that is in contact with one of the inner faces of the frames.

The ring 9 is thus simple in shape, encloses the frames, and allows the frames to rotate relative to each other.

The invention claimed is:

1. A method for making a hinge mechanism for a vehicle seat, the method comprising:
   providing an assembly comprising a first frame, a second frame and an annular ring, the first and second frames each comprising an inner face, an outer face and a circular peripheral edge, the ring comprising a cylindrical base connected to a radially inwardly extending first side flap, wherein the first frame faces the second frame so the inner faces are oriented towards each other, the outer faces are oriented away from each other and the circular peripheral edges are in alignment and coaxial about an axis, and wherein the ring is disposed over the first and second frames so the first side flap covers at least a portion of the outer face of the first frame and the cylindrical base covers the peripheral edges of the first and second frames and an axial extension of the cylindrical base extends beyond the peripheral edge of the second frame,
   folding the axial extension of the cylindrical base towards the outer face of the second frame to form a second side flap while pressing the outer face of the first frame towards the second frame.

2. The method of claim 1, wherein the folding is carried out without pressing the first flap into frictional engagement with the outer face of the first frame.

3. The method of claim 1, wherein the folding is carried out in a press.

4. The method of claim 1, wherein the folding further comprises folding the axial extension of the cylindrical base to a first angle with respect to the axis that is less than 90° to form a flange, followed by folding the flange to a second angle with respect to the axis of about 90° while pressing the outer face of the first frame towards the second frame.

5. The method of claim 4, wherein the first angle is between 30° and 60°.

6. The method of claim 4, wherein the first angle is about 45°.

7. The method of claim 1, further comprising, before the folding, mounting the assembly in a press, wherein the press comprises an upper tool that faces the first frame and a lower tool that faces the second frame, and wherein the cylindrical base of the annular ring has an outside diameter,
   the upper tool comprising an outer annular surface in alignment with the first side flap and an inner annular surface aligned radially inside of the first side flap and axially offset from the outer annular surface and towards the first frame by a first distance that is greater than a thickness of the first flap, wherein the first distance equals the thickness of the first side flap plus a predetermined clearance.

8. The method of claim 7, wherein the lower tool comprises a bore hole with a first portion sized to receive the cylindrical base of the annular ring and a second portion having a diameter smaller than the first portion and smaller than the outside diameter of the cylindrical base, the lower tool further comprising a first narrowing that connects the first portion to the second portion,
   the method further comprising, prior to the folding, moving the upper and lower tools toward each other thereby pressing the outer face of the first frame with the inner annular surface of the upper tool, pressing the cylindrical base of the ring into the first narrowing and second portion of the lower tool to crimp the cylindrical base of ring onto the peripheral edge of the second frame while engaging the first side flap with the outer annular surface of the upper tool thereby maintaining the predetermined clearance between the first side flap and the outer face of the first frame.

9. The method of claim 8, wherein the lower tool comprises a third portion having a diameter smaller than the second portion with a second narrowing connecting the second portion to the third portion, and
   wherein the folding further comprises moving the upper and lower tools further towards each other so the axial extension of the cylindrical base enters the second narrowing and is folded radially inwardly while the inner annular surface of the upper tool presses the outer face of the first frame and the outer annular surface of the upper tool engages the first side flap.

10. The method of claim 9, wherein the second narrowing extends from the second portion to the third portion of the bore hole at a first angle with respect to the axis that is less than 90° to form a flange, and the method further comprises folding the flange to a second angle with respect to the axis of about 90° while pressing the outer face of the first frame towards the second frame with the inner annular surface of the upper tool and engaging the first side flap with the outer annular surface of the upper tool.

11. The method of claim 10, wherein the first angle is between 30° and 60°.

12. The method of claim 10, wherein the first angle is about 45°.

\* \* \* \* \*